US012752557B2

(12) United States Patent
Saka et al.

(10) Patent No.: US 12,752,557 B2
(45) Date of Patent: Oct. 6, 2026

(54) RECORDING DEVICE

(71) Applicant: SEIKO EPSON CORPORATION, Tokyo (JP)

(72) Inventors: Yoshihisa Saka, Shiojiri (JP); Yoshinori Yanagisawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 130 days.

(21) Appl. No.: 18/441,430

(22) Filed: Feb. 14, 2024

(65) Prior Publication Data

US 2024/0270002 A1 Aug. 15, 2024

(30) Foreign Application Priority Data

Feb. 15, 2023 (JP) ................................ 2023-021419

(51) Int. Cl.

| | |
|---|---|
| ***B41J 29/02*** | (2006.01) |
| ***B41J 2/17*** | (2006.01) |
| ***B41J 11/00*** | (2006.01) |
| ***B41J 11/02*** | (2006.01) |
| ***B41J 13/10*** | (2006.01) |
| ***B41J 29/13*** | (2006.01) |

(52) U.S. Cl.

CPC ............ *B41J 29/02* (2013.01); *B41J 2/1721* (2013.01); *B41J 11/007* (2013.01); *B41J 11/02* (2013.01); *B41J 13/103* (2013.01); *B41J 29/13* (2013.01)

(58) Field of Classification Search

CPC ...................................................... B41J 29/026

See application file for complete search history.

(56) References Cited

U.S. PATENT DOCUMENTS

| | | | | |
|---|---|---|---|---|
| 2009/0302521 | A1* | 12/2009 | Kondo | G03G 15/6502 271/9.01 |
| 2012/0048194 | A1* | 3/2012 | Watanabe | B41J 29/08 118/712 |
| 2013/0050382 | A1* | 2/2013 | Okamoto | B41J 29/026 347/108 |
| 2016/0291519 | A1* | 10/2016 | Oguri | B65H 5/26 |
| 2017/0219992 | A1 | 8/2017 | Yasui | |
| 2018/0050534 | A1* | 2/2018 | Shimomura | B41J 2/1752 |

FOREIGN PATENT DOCUMENTS

| | | |
|---|---|---|
| JP | 2016-090804 A | 5/2016 |

* cited by examiner

*Primary Examiner* — Shelby L Fidler

(74) *Attorney, Agent, or Firm* — WORKMAN NYDEGGER

(57) ABSTRACT

A recording device includes a recording unit configured to perform recording on a medium and a housing configured to accommodate the recording unit. The housing includes a frame and a bottom portion attached to the frame. The bottom portion includes a first bottom portion fixed to the frame and a second bottom portion detachably fixed to the frame.

14 Claims, 9 Drawing Sheets

RECORDING DEVICE

The present application is based on, and claims priority from JP Application Serial Number 2023-021419, filed Feb. 15, 2023, the disclosure of which is hereby incorporated by reference herein in its entirety.

BACKGROUND

1. Technical Field

The present disclosure relates to a recording device.

2. Related Art

For example, as in JP-A-2016-90804, a recording device including a bottom portion below a frame of a structure is disclosed as a recording device that performs recording on a medium. In such a recording device, the bottom portion includes a bottom plate portion formed of a plate-shaped member and a reinforcing plate for reinforcing the bottom plate portion. This makes it possible to realize a configuration in which rigidity of the bottom portion of the structure can be increased at a low cost.

However, in such a recording device, the bottom portion covers a lower side of the frame. For this reason, for example, when an additional unit is installed below the frame, it is necessary to secure a communication path between the recording device and the additional unit. In such a case, it is necessary to remove the entire bottom portion, which reduces work efficiency.

SUMMARY

In a recording device for solving the above problems, a housing includes a frame and a bottom portion attached to the frame, and the bottom portion includes a first bottom portion fixed to the frame and a second bottom portion detachably fixed to the frame.

DESCRIPTION OF EMBODIMENTS

First Embodiment

An embodiment of a recording device will be described below with reference to the drawings. In the following description, assuming that the recording device is placed on a horizontal plane, a direction intersecting (for example, orthogonal to) a vertical direction Z will be referred to as a lateral direction X, and a direction intersecting the vertical direction Z and the lateral direction X will be referred to as a longitudinal direction Y. The lateral direction X corresponds to an example of a first direction. One direction in the longitudinal direction Y will be referred to as a forward direction Y1, and the other direction in the longitudinal direction Y will be referred to as a rearward direction Y2. Further, a side in the forward direction Y1 will be referred to as a front side, a direction rightward in the lateral direction X will be referred to as a rightward direction X1, and a direction leftward in the lateral direction X will be referred to as a leftward direction X2. A direction upward in the vertical direction Z will be referred to as an upward direction Z1, and a direction downward in the vertical direction Z will be referred to as a downward direction Z2.

Recording Device 10

Figure 1:
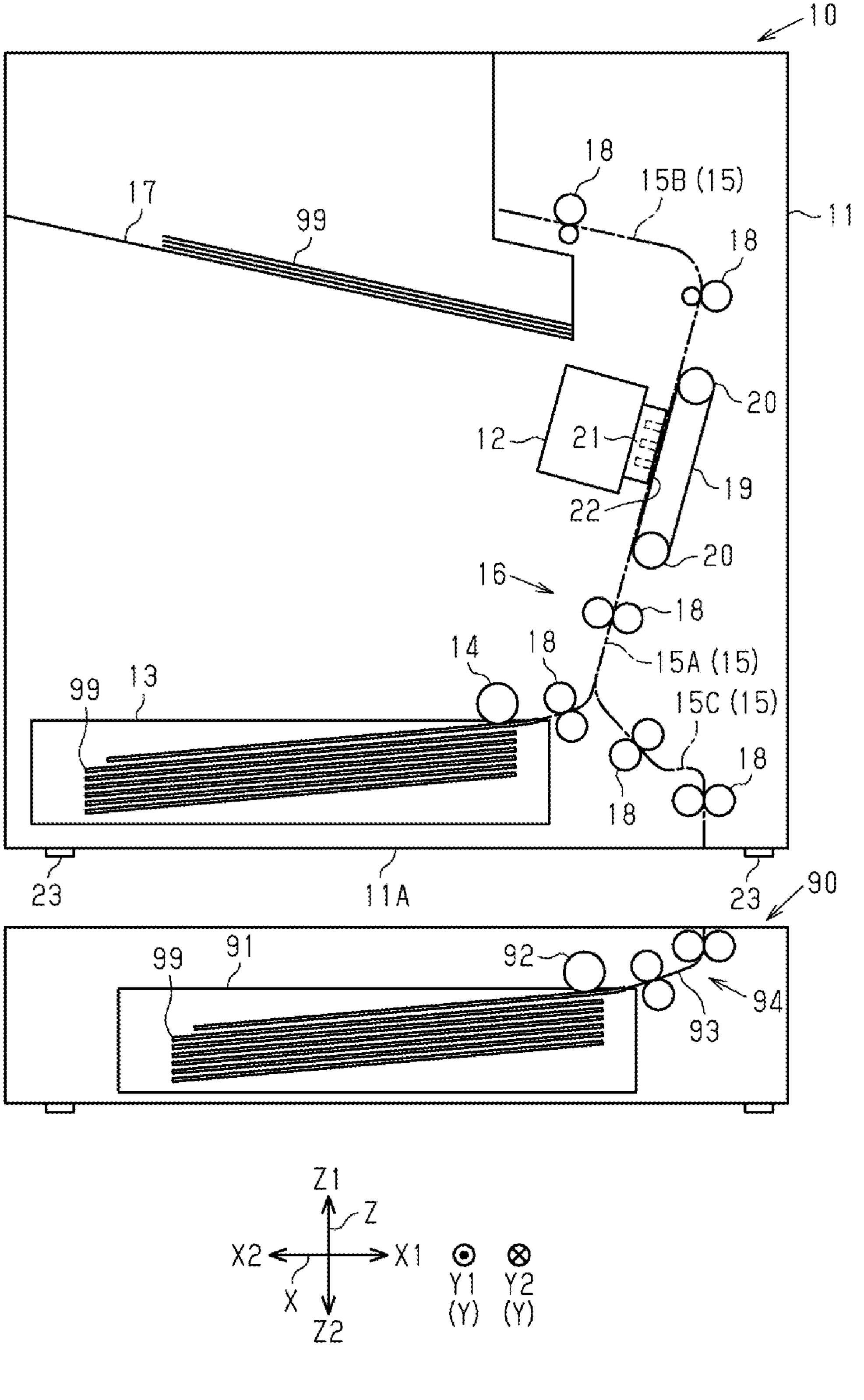
FIG. 1 is a schematic diagram of an embodiment of a recording device and an additional unit.

As illustrated in FIG. 1, a recording device 10 is configured to perform recording on a medium 99. The recording device 10 may be an inkjet printer that performs printing by discharging ink serving as an example of a liquid onto the medium 99. The medium 99 may be, for example, paper, cloth, vinyl, a plastic component, a metal component, or the like.

The recording device 10 includes a housing 11 and a recording unit 12. The recording device 10 may include a medium accommodating unit 13, a feeding unit 14, a conveying path 15, a conveying unit 16, and a stacker 17. The recording device 10 may include one or a plurality of medium accommodating units 13 and the same number of feeding units 14 as the medium accommodating units 13.

The housing 11 is configured to accommodate various members forming the recording device 10. In particular, the housing 11 is configured to accommodate at least the recording unit 12. The housing 11 may be configured to accommodate the medium accommodating unit 13, the feeding unit 14, the conveying path 15, and the conveying unit 16. The housing 11 includes a bottom surface 11A. The bottom surface 11A forms a bottom surface of the recording device 10.

The medium accommodating unit 13 may be able to accommodate a plurality of media 99 in a stacked state. The feeding unit 14 sends out, from the corresponding medium accommodating unit 13, the media 99 accommodated in the medium accommodating unit 13 one by one to the conveying path 15.

The conveying path 15 is a path along which the media 99 are conveyed by the conveying unit 16. The conveying path 15 links the medium accommodating unit 13 to the stacker 17. The stacker 17 receives the conveyed media 99. The stacker 17 can stack one or a plurality of media 99 on which recording has been performed.

The conveying path 15 may include a first conveying path 15A and a second conveying path 15B. The first conveying path 15A links the medium accommodating unit 13 to the recording unit 12. That is, the first conveying path 15A is a path for conveying the medium 99 to the recording unit 12. The second conveying path 15B links the recording unit 12 to the stacker 17. That is, the second conveying path 15B is a path for conveying the medium 99 from the recording unit 12 to the outside.

The conveying path 15 may include a third conveying path 15C. The third conveying path 15C is a path for causing the medium 99 conveyed from an additional unit 90, which will be described later, to join the first conveying path 15A.

The conveying unit 16 conveys the medium 99 sent out by the feeding unit 14 along the conveying path 15. The conveying unit 16 discharges the conveyed medium 99 to the stacker 17. The conveying unit 16 may include a plurality of conveying rollers 18. Each of the plurality of conveying rollers 18 rotates with the medium 99 interposed therebetween to convey the medium 99.

The conveying unit 16 may include an endless conveying belt 19 and a pair of pulleys 20. The conveying belt 19 is wound around a pair of pulleys 20. The conveying belt 19 rotates with the medium 99 adhered thereto, thereby conveying the medium 99 along a conveying direction. The conveying belt 19 functions as an example of a medium support unit configured to support the medium 99. As another example, the medium support unit may be configured of a fixed platen without using the conveying belt 19.

The recording unit 12 is configured to perform recording on the medium 99. In particular, the recording unit 12 is configured to perform recording on the medium 99 by discharging the liquid. The recording unit 12 is provided at a position along the conveying path 15.

The recording unit 12 is configured to perform recording on the medium 99 by discharging the liquid onto the medium 99 supported by the conveying belt 19. The recording unit 12 may be configured to discharge the liquid in a discharging direction. The discharging direction is a direction perpendicular to the conveying direction of the medium 99. The discharging direction may form an angle of 15 degrees with a horizontal direction.

The recording unit 12 is a line head, but may be a serial head. The line head is a head that can discharge the liquid all at once across a width of the medium 99. The serial head is a head that scans the medium 99 in a width direction of the medium 99.

The recording unit 12 includes a plurality of nozzles 21 and a nozzle surface 22. Each of the plurality of nozzles 21 is configured to discharge the liquid. Each of the plurality of nozzles 21 opens in the nozzle surface 22. That is, the nozzle surface 22 is configured such that each of the plurality of nozzles 21 opens therein. The nozzle surface 22 is a surface orthogonal to the discharging direction. In this way, the recording unit 12 can discharge the liquid in the discharging direction perpendicular to the nozzle surface 22. In addition, the conveying belt 19 is provided at a position facing the nozzle surface 22.

The recording device 10 may include a display unit (not illustrated) and an operation unit (not illustrated). The display unit is configured to display information. The operation unit is configured to be operated by a user. The display unit and the operation unit may be integrally configured as a touch panel, or may be separately configured. The display unit and the operation unit may be provided on a side facing in the forward direction Y1. Thus, the user uses the recording device 10 with the side facing the forward direction Y1 as the front side. That is, the forward direction Y1 is a direction toward the front side. The forward direction Y1 corresponds to an example of a second direction.

The recording device 10 may include a plurality of installation portions 23. The recording device 10 may include four installation portions 23, but is not limited thereto, and may include two, three, five, or more installation portions 23. Each of the plurality of installation portions 23 is provided at the bottom surface 11A. Each of the plurality of installation portions 23 is configured to protrude from the bottom surface 11A in the downward direction Z2. Each of the plurality of installation portions 23 can be installed on an installation surface. Each of the plurality of installation portions 23 may be a foot for installing the housing 11 on the installation surface. The recording device 10 is installed at the installation surface with each of the plurality of installation portions 23 being in contact with the installation surface without the bottom surface 11A being in contact with the installation surface.

The recording device 10 may be attachable to the additional unit 90. In the recording device 10, the additional unit 90 may be attachable to a side of the bottom surface 11A in the downward direction Z2. The recording device 10 and the additional unit 90 may form a recording unit. The recording device 10 may include the additional unit 90.

The additional unit 90 may be an additional paper feeding unit that feeds the media 99. The additional unit 90 may include an additional medium accommodating unit 91, an additional feeding unit 92, an additional conveying path 93, and an additional conveying unit 94. The additional medium accommodating unit 91 may be able to accommodate a plurality of media 99 in a stacked state. The additional feeding unit 92 sends out, from the corresponding additional medium accommodating unit 91, the media 99 accommodated in the additional medium accommodating unit 91 one by one to the additional conveying path 93.

The additional conveying path 93 is a path along which the media 99 are conveyed by the additional conveying unit 94. The additional conveying path 93 joins the third conveying path 15C. The additional conveying unit 94 conveys the media 99 sent out by the additional feeding unit 92 along the additional conveying path 93 and causes the media 99 conveyed along the additional conveying path 93 to join the third conveying path 15C.

Detailed Configuration of Housing 11

A detailed configuration of the housing 11 will be described here with reference to FIGS. 2 to 8.

As illustrated in FIGS. 2 to 6, the housing 11 includes a frame 24. The frame 24 forms a framework of the housing 11. The frame 24 may have a cubic shape. The frame 24 is configured to accommodate at least the recording unit 12.

The frame 24 includes a bottom surface 24A. The bottom surface 24A is a surface facing the downward direction Z2 of the frame 24. The bottom surface 24A forms a part of the bottom surface 11A of the housing 11. The installation portions 23 may be attached to the bottom surface 24A.

The frame 24 includes a lower opening portion 24B. The lower opening portion 24B is provided in the bottom surface 24A. The lower opening portion 24B is configured to open in the downward direction Z2. The frame 24 may include opening portions that open in the rightward direction X1, the leftward direction X2, the forward direction Y1, the rearward direction Y2, and the upward direction Z1. The opening portions may be covered by various types of sheathing.

Figure 3:
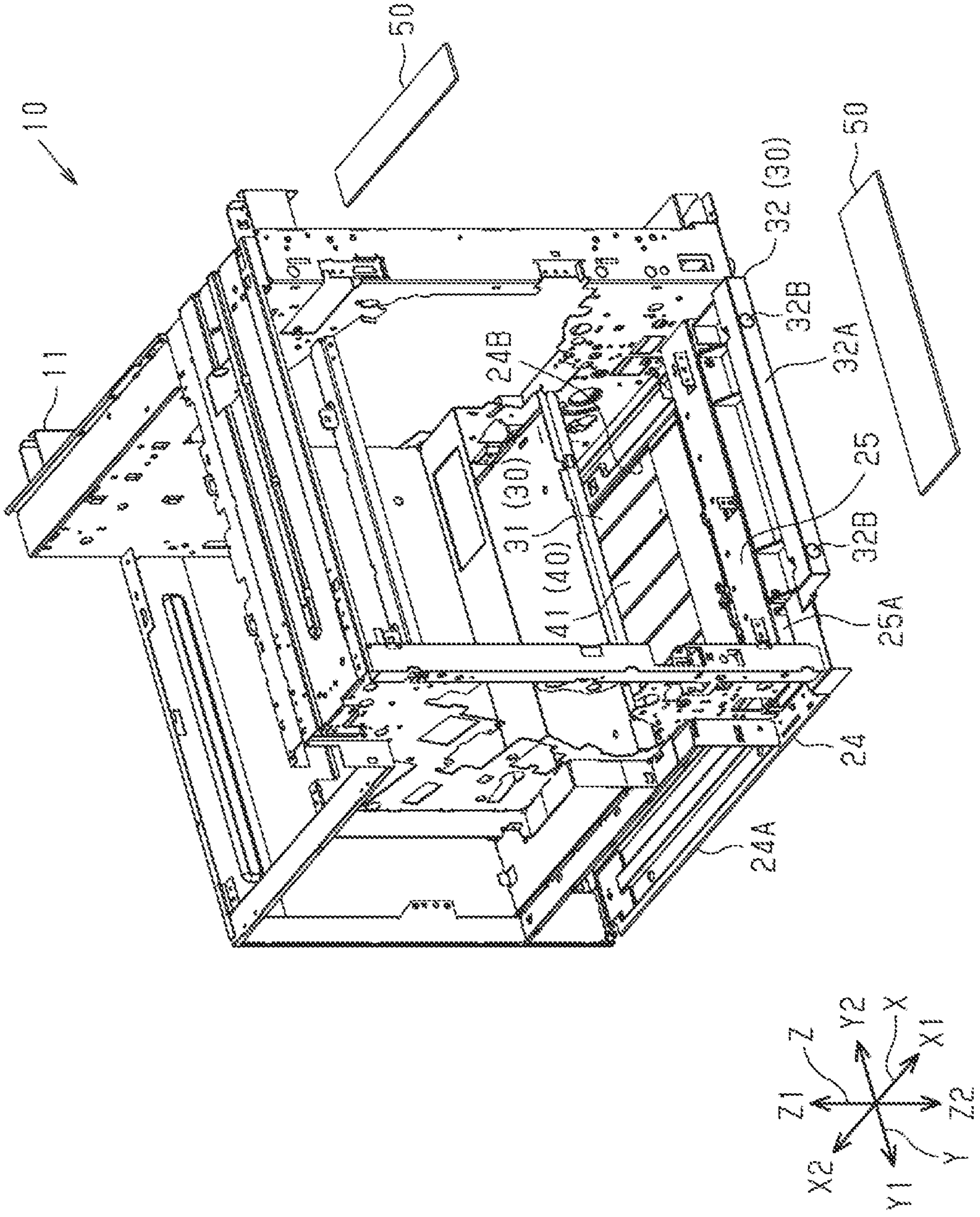
FIG. 3 is a perspective view illustrating the recording device.

The frame 24 may include a first frame 25 (see FIG. 3). The first frame 25 is located on a side biased in the rightward direction X1 and in the downward direction Z2. The first frame 25 extends along the longitudinal direction Y.

Figure 4:
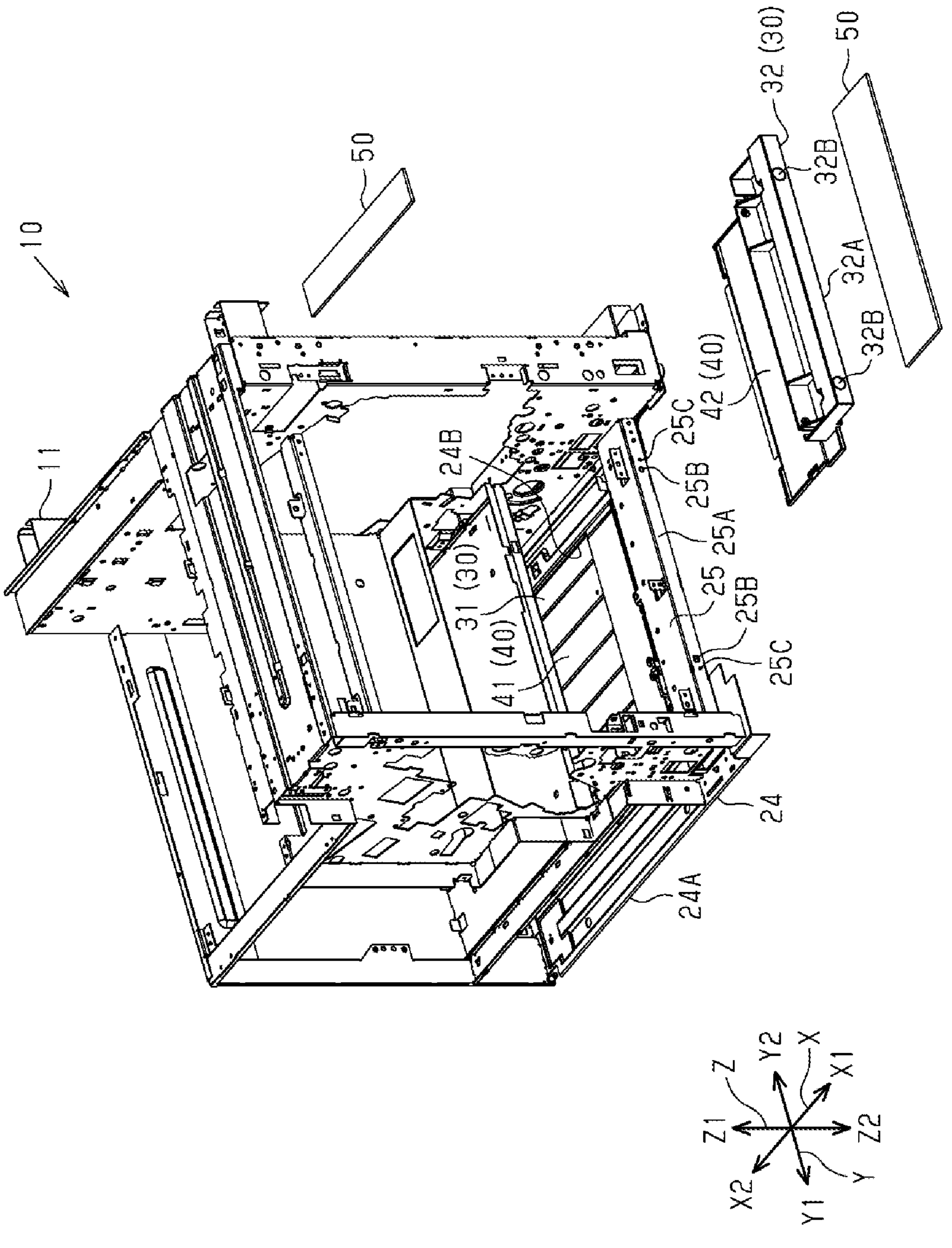
FIG. 4 is a perspective view illustrating the recording device.

As illustrated in FIG. 4, the first frame 25 includes a right side surface 25A. The right side surface 25A is a surface facing the rightward direction X1 of the first frame 25. The right side surface 25A may include a positioning hole 25B. The right side surface 25A may include a plurality of positioning holes 25B. The positioning hole 25B is configured to open in the rightward direction X1. The positioning hole 25B is a hole for positioning a second bottom portion 32, which will be described later, when the second bottom portion 32 is attached to the frame 24.

The right side surface 25A may include a screw hole 25C. The right side surface 25A may include a plurality of screw holes 25C. The screw hole 25C is configured to open in the rightward direction X1. The screw hole 25C is a hole for fixing the second bottom portion 32, which will be described later, to the frame 24 when the second bottom portion 32 is attached to the frame 24.

Figure 2:
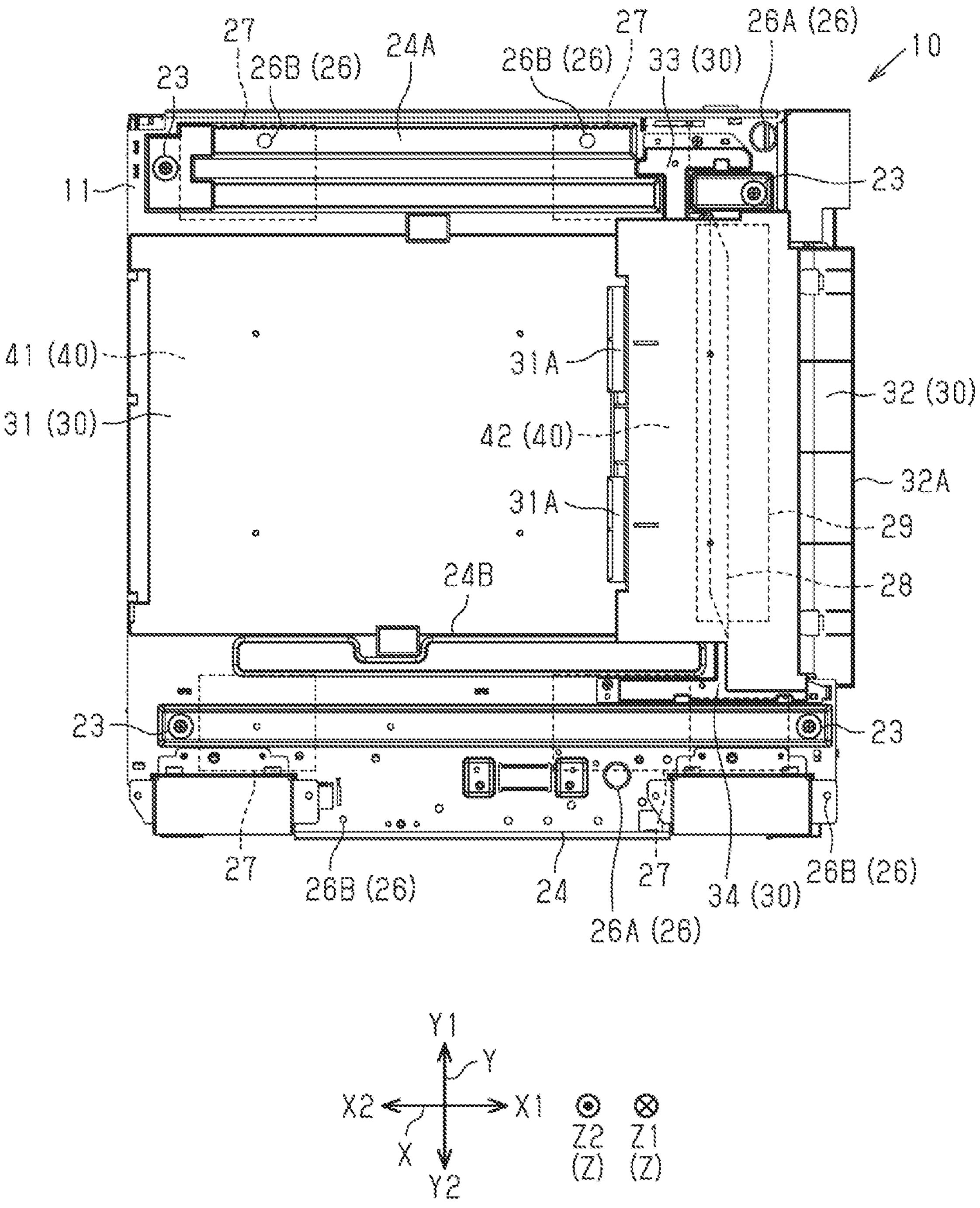
FIG. 2 is a bottom view illustrating the recording device.

As illustrated in FIG. 2, the frame 24 may include an attaching portion 26. That is, the recording device 10 may include the attaching portion 26. The attaching portion 26 is provided at the bottom surface 24A. The attaching portion 26 can attach the additional unit 90 to a side of the recording device 10 in the downward direction Z2. In particular, the attaching portion 26 can attach the additional unit 90 to a side of a first bottom portion 31 in the downward direction Z2, which will be described later.

The attaching portion 26 may include an additional positioning hole 26A. The attaching portion 26 may include a plurality of additional positioning holes 26A. The additional positioning hole 26A is provided on the bottom surface 24A. The additional positioning hole 26A is configured to open in the downward direction Z2. The additional positioning hole 26A is a hole for positioning the additional unit 90 when the additional unit 90 is attached to the recording device 10.

The attaching portion 26 may include an additional screw hole 26B. The attaching portion 26 may include a plurality of additional screw holes 26B. The additional screw hole 26B is provided at the bottom surface 24A. The additional screw hole 26B is configured to open in the downward direction Z2. The additional screw hole 26B is a hole for fixing the additional unit 90 to the frame 24 when the additional unit 90 is attached to the recording device 10.

The recording device 10 may include a packing contact region 27. The recording device 10 may include a plurality of packing contact regions 27. The packing contact region 27 is located at the bottom surface 11A of the housing 11. The packing contact region 27 is located inward from the installation portions 23 in the lateral direction X. The packing contact region 27 is a region coming into contact with a packing material when the recording device 10 is packed. That is, the packing contact region 27 is a region that directly receives an impact via the packaging material after the recording device 10 is packed.

As illustrated in FIGS. 2 to 6, the housing 11 includes a bottom portion 30. The bottom portion 30 is provided on a side of the frame 24 in the downward direction Z2. The bottom portion 30 is configured to support the frame 24. The bottom portion 30 is attached to the frame 24. The bottom portion 30 closes the lower opening portion 24B on the side of the frame 24 in the downward direction Z2.

The bottom portion 30 may include a liquid accommodating portion 40. The liquid accommodating portion 40 is provided at an upper surface of the bottom portion 30. The liquid accommodating portion 40 is a shallow recessed portion that opens in the upward direction Z1. The liquid accommodating portion 40 can accommodate the liquid leaking from the recording unit 12. The liquid accommodating portion 40 can accommodate the liquid leaking from the recording unit 12 and transferred to the conveying belt 19.

The recording device 10 may include a liquid absorber 50. The liquid absorber 50 is provided in the liquid accommodating portion 40. The liquid absorber 50 may be integrally fixed to the liquid accommodating portion 40. The liquid absorber 50 can absorb the liquid accommodated in the liquid accommodating portion 40. That is, the liquid absorber 50 can absorb the liquid leaking from the recording unit 12. The liquid absorber 50 can absorb the liquid leaking from the recording unit 12 and transferred to the conveying belt 19.

The bottom portion 30 is divided into a plurality of members. The bottom portion 30 includes a first bottom portion 31 and a second bottom portion 32. The first bottom portion 31 is provided on a side in the leftward direction X2. The first bottom portion 31 forms a part of the bottom surface 11A of the housing 11. The first bottom portion 31 forms a part of the bottom surface 11A of the housing 11 in a larger area than the second bottom portion 32. The first bottom portion 31 may have a flat plate shape. The first bottom portion 31 closes a part of the lower opening portion 24B. The first bottom portion 31 is fixed to the frame 24. The first bottom portion 31 is located on a side of the medium accommodating unit 13 in the downward direction Z2.

Figure 5:
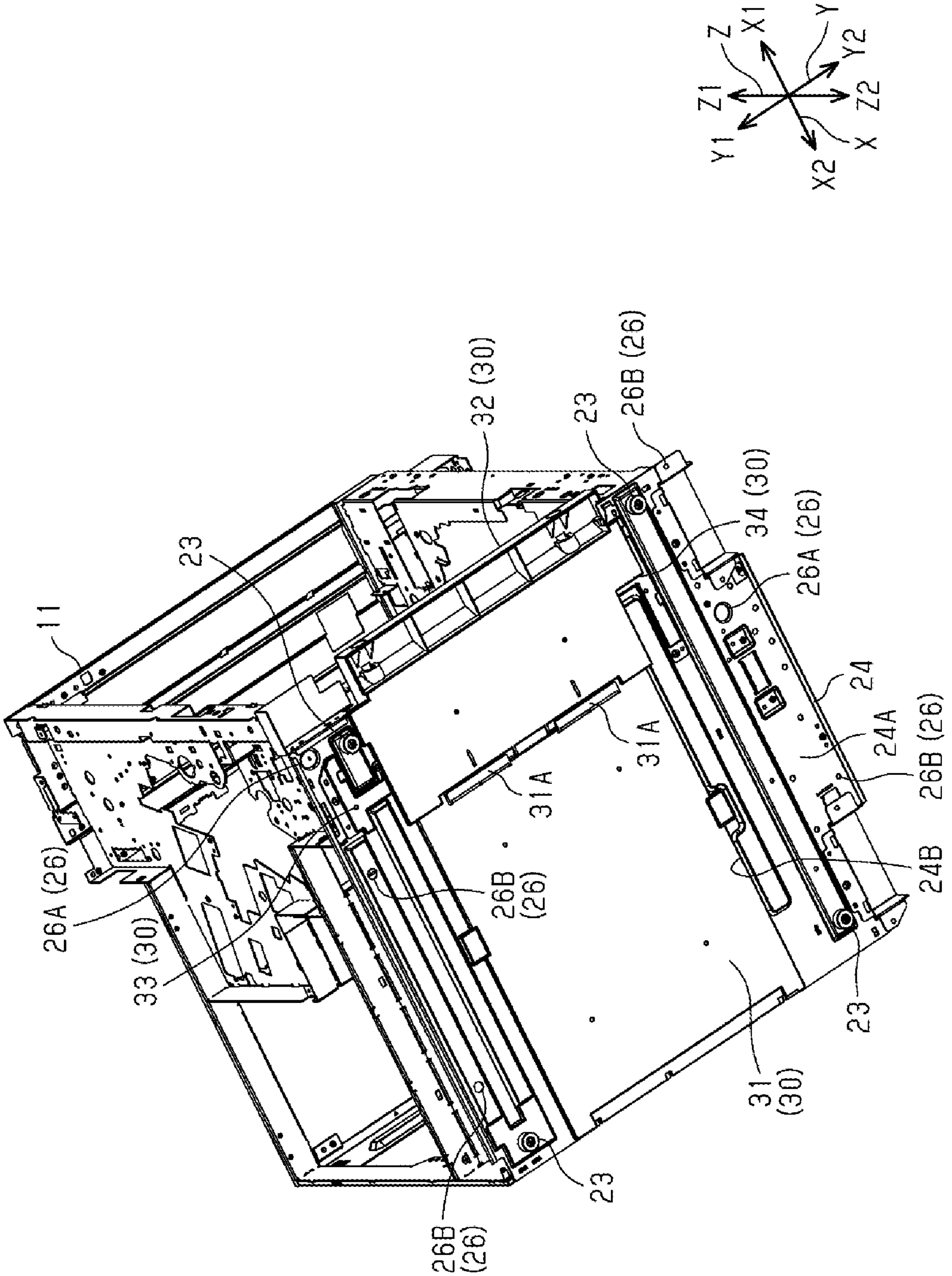
FIG. 5 is a perspective view illustrating the recording device.

The first bottom portion 31 includes a first liquid accommodating portion 41 as the liquid accommodating portion 40. The first liquid accommodating portion 41 is provided at an upper surface of the first bottom portion 31. The first bottom portion 31 may have a shallow recessed shape that opens in the upward direction Z1. The first bottom portion 31 may be a tray with a part or all of its peripheral edge portion having a protruding shape. The liquid absorber 50 may be installed in the first liquid accommodating portion 41. In FIGS. 4 and 5, the liquid absorber 50 installed in the first liquid accommodating portion 41 is a representative one, and a plurality of liquid absorbers 50 may be provided in the first liquid accommodating portion 41.

The first bottom portion 31 may include a contact portion 31A. The first bottom portion 31 may include a plurality of contact portions 31A. The contact portion 31A is provided at an end portion of the first bottom portion 31 in the rightward direction X1. The contact portion 31A is provided on a bottom surface side of the first bottom portion 31. The contact portion 31A is a portion for positioning the second bottom portion 32, which will be described later, when the second bottom portion 32 is attached to the frame 24.

The second bottom portion 32 is provided on a side in the rightward direction X1. The second bottom portion 32 forms a part of the bottom surface 11A of the housing 11. The second bottom portion 32 forms a part of the bottom surface 11A of the housing 11 in a smaller area than the first bottom portion 31. The second bottom portion 32 may have a flat plate shape. The second bottom portion 32 closes a part of the lower opening portion 24B. The second bottom portion 32 is attachable to and detachable from the frame 24. In particular, the second bottom portion 32 is attachable and detachable along the lateral direction X. Further, the second bottom portion 32 is located between the installation portions 23 in the longitudinal direction Y. That is, the installation portions 23 are not provided in a movement region of the second bottom portion 32, but is provided outside a movement region of the second bottom portion 32.

The second bottom portion 32 includes a second liquid accommodating portion 42 (see FIGS. 4 and 7) as the liquid accommodating portion 40. The second liquid accommodating portion 42 is provided at an upper surface of the second bottom portion 32. The second bottom portion 32 may have a shallow recessed shape that opens in the upward direction Z1. The second bottom portion 32 may be a tray with a part or all of its peripheral edge portion having a protruding shape. The liquid absorber 50 may be installed in the second liquid accommodating portion 42.

The second bottom portion 32 includes a grip portion 32A. The grip portion 32A is provided at an end portion of the second bottom portion 32 in the rightward direction X1. The grip portion 32A can be gripped by the user, a service person, or the like. In addition, the second bottom portion 32 is attachable and detachable along the lateral direction X by gripping the grip portion 32A.

As illustrated in FIGS. 3 and 4, the second bottom portion 32 may include an opening portion 32B. The second bottom portion 32 may include a plurality of opening portions 32B. The opening portion 32B is provided at a surface of the second bottom portion 32 in the rightward direction X1. The opening portion 32B extends in the lateral direction X. A driver can be inserted into the opening portion 32B.

Figure 6:
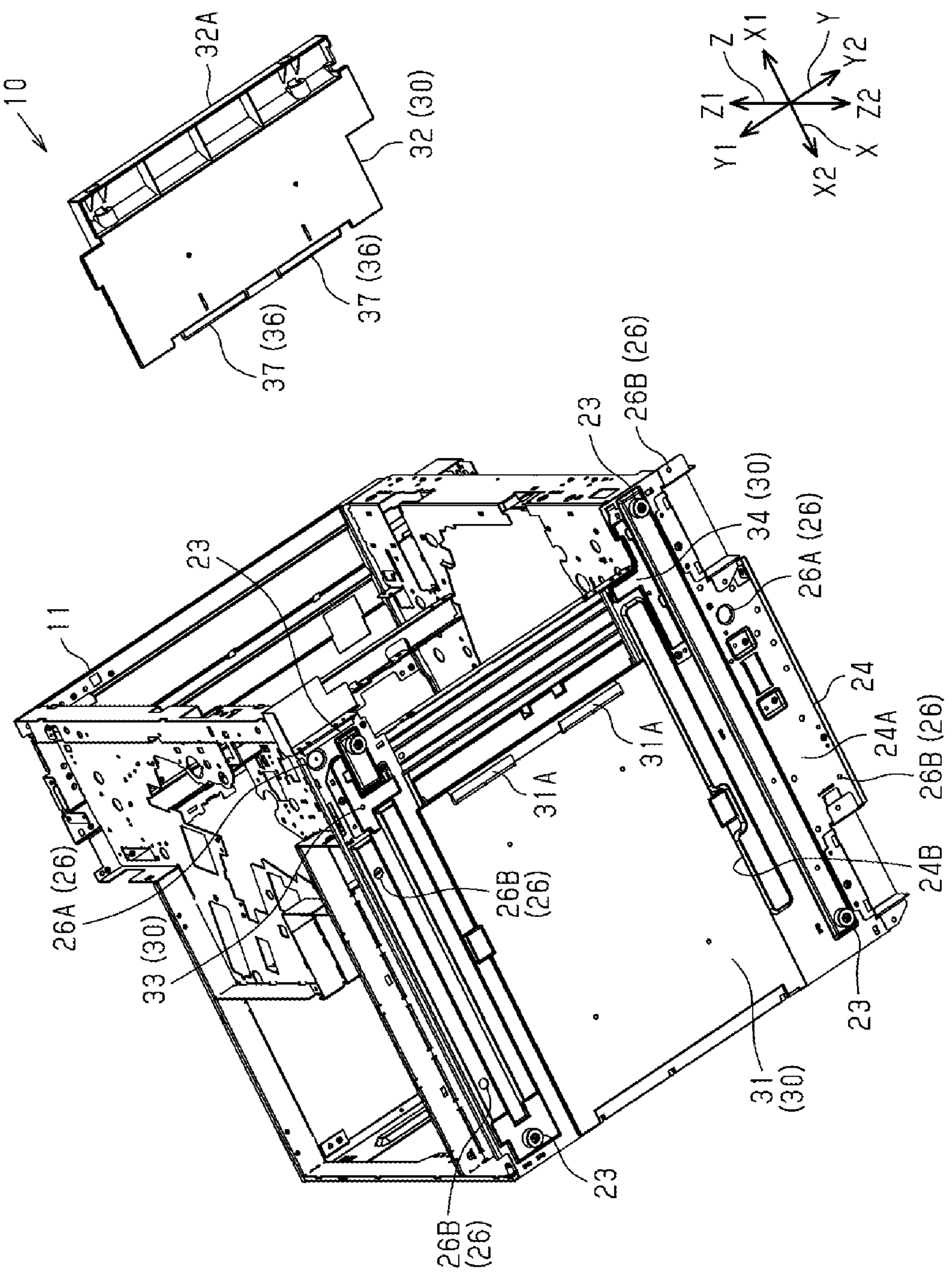
FIG. 6 is a perspective view illustrating the recording device.
Figure 7:
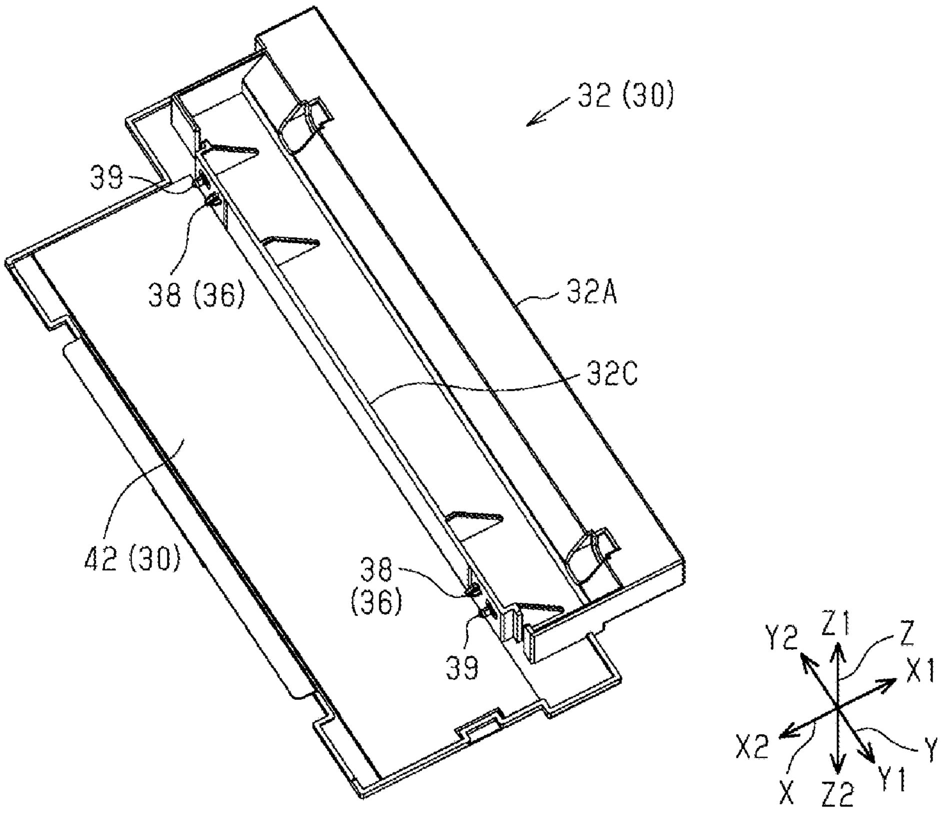
FIG. 7 is a perspective view illustrating a second bottom portion.

As illustrated in FIGS. 6 and 7, the second bottom portion 32 may include a positioning portion 36. When the second bottom portion 32 is attached to the frame 24, the positioning portion 36 performs positioning with respect to the frame 24. When the second bottom portion 32 is attached to the frame 24, the positioning portion 36 performs positioning with respect to the first bottom portion 31.

As illustrated in FIG. 6, the positioning portion 36 may include a first positioning portion 37. The positioning portion 36 may include a plurality of first positioning portions 37. The first positioning portion 37 is provided at an end portion of the second bottom portion 32 on a side in the leftward direction X2. The first positioning portion 37 is provided at a bottom surface of the second bottom portion 32. The first positioning portion 37 is configured to protrude in the leftward direction X2. The first positioning portion 37 may have a thin plate shape. When the second bottom portion 32 is attached to the frame 24, the first positioning portion 37 comes into contact with the contact portion 31A to position the second bottom portion 32 with respect to the first bottom portion 31.

As illustrated in FIG. 7, the positioning portion 36 may include a second positioning portion 38. The positioning portion 36 may include a plurality of second positioning portions 38. The second positioning portion 38 is provided at a middle plate 32C of the second bottom portion 32. The middle plate 32C protrudes from the second bottom portion 32 in the upward direction Z1. The middle plate 32C extends in the longitudinal direction Y. The second positioning portion 38 protrudes from the middle plate 32C in the leftward direction X2. When the second bottom portion 32 is attached to the frame 24, the second positioning portion 38 is inserted into the positioning hole 25B to position the second bottom portion 32 with respect to the frame 24.

The second bottom portion 32 may include a fixing portion 39. That is, the recording device 10 may include the fixing portion 39. The second bottom portion 32 may include a plurality of fixing portions 39. The fixing portion 39 may be a screw. The fixing portion 39 is screwed into the screw hole 25C by a driver inserted from the opening portion 32B. In this way, when the second bottom portion 32 is attached to the frame 24, the fixing portion 39 fixes the second bottom portion 32 to the frame 24. Also, the fixing portion 39 may be able to fix the second bottom portion 32 to the frame 24 by an operation in the rightward direction X1, and may be able to release the fixing of the second bottom portion 32 to the frame 24 by an operation in the rightward direction X1.

Further, as illustrated in FIG. 2, the second bottom portion 32 is provided partially or entirely overlapping a first region 28 in the lateral direction X and the longitudinal direction Y in a plan view in the vertical direction Z. The first region 28 is a region of the nozzle surface 22 in a plan view in the vertical direction Z. In the embodiment illustrated in FIG. 2, the second liquid accommodating portion 42 is provided entirely overlapping the nozzle surface 22 in the lateral direction X and the longitudinal direction Y in a plan view in the vertical direction Z.

In addition, the second bottom portion 32 is provided partially or entirely overlapping a second region 29 in the lateral direction X and the longitudinal direction Y in a plan view in the vertical direction Z. The second region 29 is a region of the conveying belt 19 in a plan view in the vertical direction Z. In the embodiment illustrated in FIG. 2, the second liquid accommodating portion 42 is provided entirely overlapping the conveying belt 19 in the lateral direction X and the longitudinal direction Y in a plan view in the vertical direction Z.

Further, when the second bottom portion 32 is attached to the frame 24, the second bottom portion 32 is disposed such that the first conveying path 15A is located between the second bottom portion 32 and the nozzle surface 22 in the vertical direction Z. That is, when the second bottom portion 32 is attached to the frame 24, the first conveying path 15A illustrated in FIG. 1 is provided between the second bottom portion 32 and the nozzle surface 22 in the vertical direction Z.

The bottom portion 30 may include a third bottom portion 33. The third bottom portion 33 is provided on a side in the rightward direction X1 as illustrated in FIG. 2. The third bottom portion 33 is provided on a side of the second bottom portion 32 in the forward direction Y1. The third bottom portion 33 forms a part of the bottom surface 11A of the housing 11. The third bottom portion 33 forms a part of the bottom surface 11A of the housing 11 in a smaller area than the second bottom portion 32. The third bottom portion 33 may have a flat plate shape. The third bottom portion 33 closes a part of the lower opening portion 24B. The third bottom portion 33 is fixed to the frame 24.

The third bottom portion 33 is located inward from the installation portions 23 in the lateral direction X. Thus, the third bottom portion 33 forms a part of the bottom surface 11A of the housing 11 outside the movement region of the second bottom portion 32. The third bottom portion 33 is provided in a part of the packing contact region 27. Thus, the third bottom portion 33 receives an impact from the packaging material, and a direct impact on the second bottom portion 32 can be reduced.

The third bottom portion 33 includes a third liquid accommodating portion (not illustrated) as the liquid accommodating portion 40. The third liquid accommodating portion is provided at an upper surface of the third bottom portion 33. The third bottom portion 33 may have a shallow recessed shape that opens in the upward direction Z1. The third bottom portion 33 may be a tray with a part or all of its peripheral edge portion having a protruding shape. The liquid absorber 50 is not installed in the third liquid accommodating portion, but may be installed in the third liquid accommodating portion.

The bottom portion 30 may include a fourth bottom portion 34. The fourth bottom portion 34 is provided on a side in the rightward direction X1 as illustrated in FIG. 2. The fourth bottom portion 34 is provided on a side of the second bottom portion 32 in the rearward direction Y2. The fourth bottom portion 34 forms a part of the bottom surface 11A of the housing 11. The fourth bottom portion 34 forms a part of the bottom surface 11A of the housing 11 in a smaller area than the second bottom portion 32. The fourth bottom portion 34 may have a flat plate shape. The fourth bottom portion 34 closes a part of the lower opening portion 24B. The fourth bottom portion 34 is fixed to the frame 24.

The fourth bottom portion 34 is located inward from the installation portions 23 in the lateral direction X. Thus, the fourth bottom portion 34 forms a part of the bottom surface 11A of the housing 11 outside the movement region of the second bottom portion 32. The fourth bottom portion 34 is provided in a part of the packing contact region 27. Thus, the fourth bottom portion 34 receives an impact from the packaging material, and a direct impact on the second bottom portion 32 can be reduced.

The fourth bottom portion 34 includes a fourth liquid accommodating portion (not illustrated) as the liquid accommodating portion 40. The fourth liquid accommodating portion is provided at an upper surface of the fourth bottom portion 34. The fourth bottom portion 34 may have a shallow recessed shape that opens in the upward direction Z1. The fourth bottom portion 34 may be a tray with a part or all of its peripheral edge portion having a protruding shape. The liquid absorber 50 is not installed in the fourth liquid accommodating portion, but may be installed in the fourth liquid accommodating portion.

Figure 8:
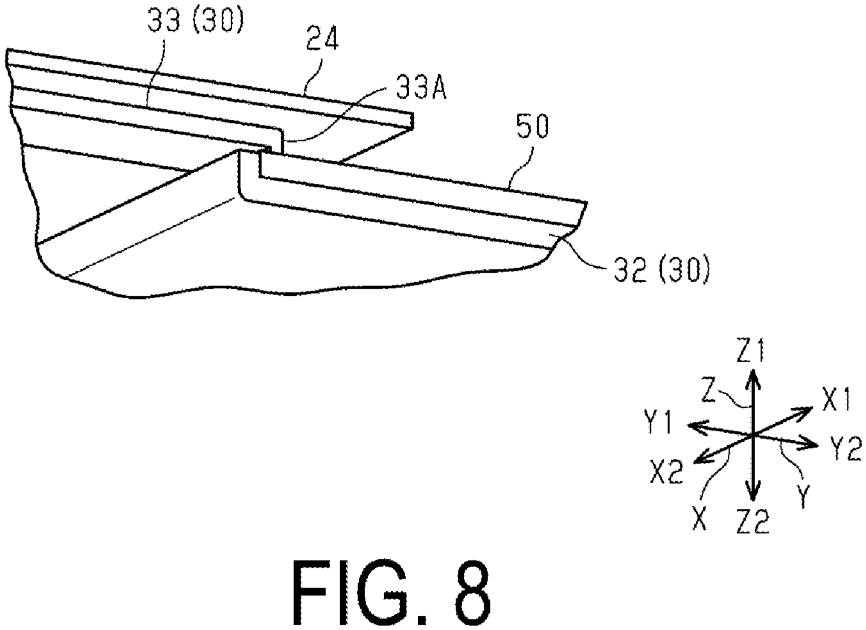
FIG. 8 is a perspective view illustrating the second bottom portion and a third bottom portion.

Also, as illustrated in FIG. 8, the third bottom portion 33 includes a rear end portion 33A. The rear end portion 33A is an end portion of the third bottom portion 33 in the rearward direction Y2. The rear end portion 33A is an end portion continuous with the third liquid accommodating portion. The rear end portion 33A has a flat plate shape and does not protrude in the upward direction Z1. The rear end portion 33A is located on a side of the second bottom portion 32 in the upward direction Z1 of vertical direction Z.

In this way, the third bottom portion 33 has a smaller size than the second bottom portion 32 and has a smaller liquid storage capacity than the second bottom portion 32. For this reason, the third bottom portion 33 can cause the accommodated liquid to flow down from the rear end portion 33A to the second bottom portion 32.

Further, similarly to the third bottom portion 33, the fourth bottom portion 34 also has a smaller size than the second bottom portion 32 and has a smaller liquid storage capacity than the second bottom portion 32. For this reason, similarly to the third bottom portion 33, the fourth bottom portion 34 can also cause the accommodated liquid to flow down from its front end portion (not illustrated) to the second bottom portion 32.

In this way, a part of the lower opening portion 24B is closed by the first bottom portion 31, the third bottom portion 33, and the fourth bottom portion 34, but when the second bottom portion 32 is removed from the frame 24, a part of the lower opening portion 24B is opened. That is, the second bottom portion 32 closes a part of the lower opening portion 24B when attached to the frame 24, and opens the part of the lower opening portion 24B when removed from the frame 24.

Thus, a part of the lower opening portion 24B can communicate with the outside of the recording device 10 in the downward direction Z2. In addition, when the second bottom portion 32 is removed from the frame 24, while the additional unit 90 is attached to the recording device 10, a part of the lower opening portion 24B enables communication between the additional unit 90 and the inside of the housing 11. A region of the lower opening portion 24B that can be closed by the second bottom portion 32 functions as an example of a communication path.

Detailed Configuration of Additional Unit 90

Next, the additional unit 90 will be described with reference to FIG. 9.

Figure 9:
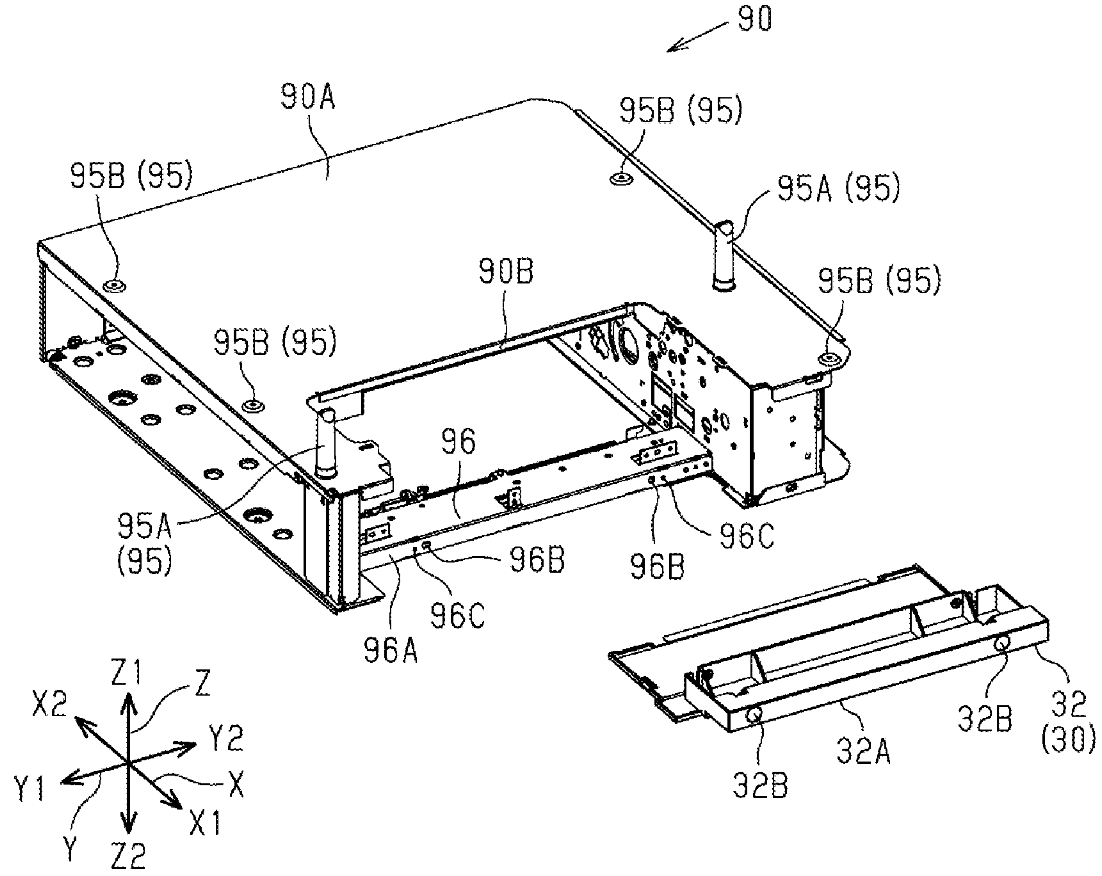
FIG. 9 is a perspective view illustrating the additional unit.

As illustrated in FIG. 9, the additional unit 90 includes an upper surface 90A. The upper surface 90A is a surface facing the upward direction Z1. The upper surface 90A includes an additional communication port 90B. The additional communication port 90B is provided on a side in the rightward direction X1. The additional communication port 90B can communicate with the communication path of the recording device 10.

The additional unit 90 may include a coupling portion 95. The coupling portion 95 is provided at the upper surface 90A. The coupling portion 95 can be attached to the attaching portion 26. That is, the additional unit 90 can be attached to the side of the recording device 10 in the downward direction Z2.

The coupling portion 95 may include an additional positioning protrusion portion 95A. The coupling portion 95 may include a plurality of additional positioning protrusion portions 95A. The additional positioning protrusion portion 95A protrudes toward the upward direction Z1. The additional positioning protrusion portion 95A is a protrusion portion for positioning the additional unit 90 in the recording device 10 when the additional unit 90 is attached to the recording device 10. The additional positioning protrusion portion 95A positions the additional unit 90 in the recording device 10 by being inserted into the additional positioning hole 26A.

The coupling portion 95 may include an additional fixing portion 95B. The coupling portion 95 may include a plurality of additional fixing portions 95B. The additional fixing portion 95B protrudes in the upward direction Z1. The additional fixing portion 95B is a member for fixing the additional unit 90 to the recording device 10 when the additional unit 90 is attached to the recording device 10. The additional fixing portion 95B may be a screw. The additional fixing portion 95B is screwed into the additional screw hole 26B to fix the additional unit 90 to the recording device 10.

The additional unit 90 includes an additional frame 96. The additional frame 96 is located on a side in the rightward direction X1. The additional frame 96 extends along the longitudinal direction Y. The additional frame 96 has the same function as that of the first frame 25. The additional frame 96 includes a right side surface 96A. The right side surface 96A is a surface of the additional frame 96 facing the rightward direction X1. The right side surface 96A may include a positioning hole 96B at the same position as the positioning hole 25B. The right side surface 96A may include a screw hole 96C at the same position as the screw hole 25C. In this way, the second bottom portion 32 removed from the recording device 10 can be attached to the additional frame 96. When the second bottom portion 32 is attached to the additional unit 90, the second bottom portion 32 forms a part of a bottom surface of the additional unit 90. In this way, when removed from the frame 24, the second bottom portion 32 is attachable to and detachable from a side of the additional unit 90 in the downward direction Z2.

Operations of First Embodiment

Operations of the first embodiment will be described.

In the recording device 10, the bottom portion 30 is attached to the frame 24. Specifically, the first bottom portion 31, the third bottom portion 33, and the fourth bottom portion 34 are fixed to the frame 24. Also, the second bottom portion 32 is detachably fixed to the frame 24.

By attaching the first bottom portion 31, the second bottom portion 32, the third bottom portion 33, and the fourth bottom portion 34 to the frame 24, the entire lower opening portion 24B is closed. Thus, the housing 11 can be configured such that dust and the like hardly enter the inside thereof.

On the other hand, by removing the second bottom portion 32 from the frame 24, a part of the lower opening portion 24B is opened as a communication path. Thus, a communication path with the outside of the recording device 10 is formed. In particular, when the additional unit 90 is attached to the side of the recording device 10 in the downward direction Z2, a communication path with the additional unit 90 is formed.

In particular, by removing the fixing portion 39 from the frame 24 from a side in the rightward direction X1, the second bottom portion 32 can be removed. In addition, the second bottom portion 32 can be removed in the rightward direction X1 without tilting the recording device 10 and with the recording device 10 still installed. The removed second bottom portion 32 is attachable to the additional unit 90.

Further, the second bottom portion 32 can be attached to the frame 24 from a side in the rightward direction X1 without tilting the recording device 10 and with the recording device 10 still installed. In such a case, the frame 24 and the first bottom portion 31 can be accurately positioned by the positioning portion 36. In addition, the second bottom portion 32 can be fixed to the frame 24 by screwing the fixing portion 39 from a side in the rightward direction X1.

When the second bottom portion 32 is attached to the recording device 10, the second bottom portion 32 is disposed on sides of the nozzle surface 22, the conveying belt 19, and the first conveying path 15A in the downward direction Z2. The liquid leaking from the nozzle surface 22 can be accommodated in the second liquid accommodating portion 42 of the second bottom portion 32. In particular, the liquid absorber 50 of the second liquid accommodating portion 42 can absorb the liquid accommodated in the second liquid accommodating portion 42.

In addition, the liquid accommodating portion 40 is also provided in the first bottom portion 31, the third bottom portion 33, and the fourth bottom portion 34. For this reason, the liquid leaking from the nozzle surface 22 can also be accommodated in the liquid accommodating portion 40 of the first bottom portion 31, the third bottom portion 33, and the fourth bottom portion 34.

When the second bottom portion 32 removed from the recording device 10 is attached to the additional unit 90, the second bottom portion 32 is disposed on sides of the third conveying path 15C and the communication path in the downward direction Z2. In this way, even when the additional unit 90 is attached to the side of the recording device 10 in the downward direction Z2, the liquid leaking from the nozzle surface 22 can be accommodated in the second liquid accommodating portion 42 of the second bottom portion 32.

Effects of First Embodiment

Effects of the first embodiment will be described.

(1) The housing 11 includes the frame 24 and the bottom portion 30 attached to the frame 24. The bottom portion 30 includes the first bottom portion 31 fixed to the frame 24 and the second bottom portion 32 detachably fixed to the frame 24. According to this configuration, the first bottom portion 31 is fixed to the frame 24 while the frame 24 and the second bottom portion 32 are attachable and detachable, and thus there is no need to attach and detach the entire bottom portion 30. Accordingly, work efficiency can be improved. In addition, the second bottom portion 32 that can be removed from the frame 24 can be reduced in size. Accordingly, the removed second bottom portion 32 can be easily handled. Further, for example, when the recording device 10 is started to be used, if the second bottom portion 32 is attached, the housing 11 can be configured such that dust and the like hardly enter the inside thereof. Accordingly, it is possible to inhibit electrical malfunctions, medium contamination, and the like.

(2) The second bottom portion 32 is attachable and detachable along the lateral direction X. According to this configuration, there is no need to lift the recording device 10 to remove the second bottom portion 32 from the frame 24, and there is no need to tilt the recording device 10 to attach or detach the frame 24 and the second bottom portion 32. In this way, with the recording device 10 installed, the frame 24 and the second bottom portion 32 can be attached and detached along the lateral direction X. Accordingly, work efficiency can be improved.

(3) The second bottom portion 32 is attachable and detachable along the lateral direction X by gripping the grip portion 32A. According to this configuration, by gripping the grip portion 32A, the frame 24 and the second bottom portion 32 can be attached and detached along the lateral direction X. Accordingly, work efficiency can be improved.

(4) the lateral direction X is a direction intersecting the longitudinal direction Y facing the front side. According to this configuration, the frame 24 and the second bottom portion 32 can be attached and detached along the lateral direction X intersecting the front side of the recording device 10. Thus, degrees of freedom can be given to functions and designs on the front side of the recording device 10, and work efficiency can be improved as compared to the back side of the recording device 10.

(5) The frame 24 includes the communication path that can communicate with the outside in the downward direction Z2, and the second bottom portion 32 closes the communication path when attached to the frame 24 and opens the communication path when removed from the frame 24. According to this configuration, by removing the second bottom portion 32 from the frame 24, it is possible to open the communication path that can communicate with the outside in the downward direction Z2. Accordingly, the work efficiency of providing the communication path with the outside can be improved.

(6) When the second bottom portion 32 is removed from the frame 24, the communication path enables communication between the additional unit 90 and the inside of the housing 11. According to this configuration, by removing the second bottom portion 32 from the frame 24, it is possible to open the communication path that can communicate with the additional unit 90. Accordingly, the work efficiency of providing the communication path with the additional unit 90 can be improved.

(7) When removed from the frame 24, the second bottom portion 32 is attachable to and detachable from the side in the downward direction Z2 of the additional unit 90 attached to the attaching portion 26. According to this configuration, the second bottom portion 32 can be commonly used in the recording device 10 and the additional unit 90. Thus, there is no need to manufacture unnecessary components. Accordingly, along with improvement of the work efficiency, component costs can be reduced and contribution to the environment can be increased. In addition, the second bottom portion 32 can be easily stored.

(8) The recording unit 12 performs recording on the medium 99 by discharging the liquid. The first bottom portion 31 and the second bottom portion 32 include the liquid accommodating portion 40 that can accommodate the liquid leaking from the recording unit 12. According to this configuration, the liquid leaking from the recording unit 12 can be accommodated in the liquid accommodating portion 40 of the first bottom portion 31 and the second bottom portion 32. Accordingly, leakage of the liquid to the outside of the recording device 10 can be inhibited.

(9) The liquid absorber 50 can absorb the liquid and is provided in the liquid accommodating portion 40. According to this configuration, the liquid accommodated in the liquid accommodating portion 40 can be absorbed by the liquid absorber 50. Accordingly, leakage of the liquid to the outside of the recording device 10 can be inhibited. In addition, the liquid absorber 50 is integrally fixed to the liquid accommodating portion 40. For this reason, its assembly to the recording device 10 is facilitated. Accordingly, the work efficiency of providing the communication path with the outside can be improved.

(10) The liquid accommodating portion 40 is provided partially or entirely overlapping the nozzle surface 22 in the lateral direction X and the longitudinal direction Y in a plan view in the vertical direction Z. According to this configuration, even if the liquid leaking from the nozzle surface 22 drips in the downward direction Z2, the liquid accommodating portion 40 is provided on a side of the nozzle surface 22 in the downward direction Z2, and thus the liquid leaking from the nozzle surface 22 is easily accommodated. Accordingly, leakage of the liquid to the outside of the recording device 10 can be inhibited.

(11) The conveying belt 19 is provided at a position facing the nozzle surface 22, and the liquid accommodating portion 40 is provided partially or entirely overlapping the conveying belt 19 in the lateral direction X and the longitudinal direction Y in a plan view in the vertical direction Z. According to this configuration, even if the liquid leaking from the nozzle surface 22 flows along the conveying belt 19 and drips in the downward direction Z2, the liquid accommodating portion 40 is provided on a side of the conveying belt 19 in the downward direction Z2, and thus the liquid leaking from the nozzle surface 22 is easily accommodated. Accordingly, leakage of the liquid to the outside of the recording device 10 can be inhibited.

(12) The conveying path 15 includes the first conveying path 15A that conveys the media 99 to the recording unit 12 and the second conveying path 15B that conveys the media 99 from the recording unit 12 to the outside. At least the second bottom portion 32 includes the liquid accommodating portion 40. In addition, when the second bottom portion 32 is attached to the frame 24, the first conveying path 15A is provided between the second bottom portion 32 and the nozzle surface 22 in the vertical direction Z. According to this configuration, even if the liquid leaking from the nozzle surface 22 flows along the first conveying path 15A and drips in the downward direction Z2, the liquid accommodating portion 40 is provided on a side of the first conveying path 15A in the downward direction Z2, and thus the liquid leaking from the nozzle surface 22 is easily accommodated. Accordingly, leakage of the liquid to the outside of the recording device 10 can be inhibited. In addition, by removing the second bottom portion 32 provided with the liquid accommodating portion 40, maintenance of the liquid accommodating portion 40 provided in the second bottom portion 32 can be easily performed. Accordingly, work efficiency can be improved.

(13) The installation portions 23 are provided outside the movement region of the second bottom portion 32 at the bottom surface 11A of the housing 11. According to this configuration, the installation portions 23 are provided outside the movement region of the second bottom portion 32, and thus even when the installation portions 23 are provided, the second bottom portion 32 can be attached and detached. Accordingly, work efficiency can be improved.

(14) The second bottom portion 32 includes the positioning portion 36 that performs positioning with respect to the frame 24. According to this configuration, attachment accuracy of the second bottom portion 32, which is attachable to and detachable from the frame 24, with respect to the frame 24 can be improved. Accordingly, the second bottom portion 32 can be stably attached while work efficiency is improved.

(15) The recording device 10 includes the fixing portion 39 that fixes the second bottom portion 32 when the second bottom portion 32 is attached to the frame 24. According to this configuration, the second bottom portion 32, which is attachable to and detachable from the frame 24, can be fixed to the frame 24. Accordingly, the second bottom portion 32 can be stably attached while work efficiency is improved.

(16) The second bottom portion 32 is attachable and detachable along the lateral direction X, and the lateral direction X is a direction intersecting the longitudinal direction Y facing the front side. The fixing portion 39 can fix the second bottom portion 32 to the frame 24 by an operation in the lateral direction X. According to this configuration, the frame 24 and the second bottom portion 32 can be attached and detached by an operation in the lateral direction X intersecting the front side of the recording device 10. Thus, degrees of freedom can be given to functions and designs on the front side of the recording device 10, and work efficiency can be improved as compared to the back side of the recording device 10.

Modified Examples

The embodiment can be modified and implemented as follows. The embodiment and the following modified examples can be combined and implemented insofar as no technical contradictions arise.

Figure 10:
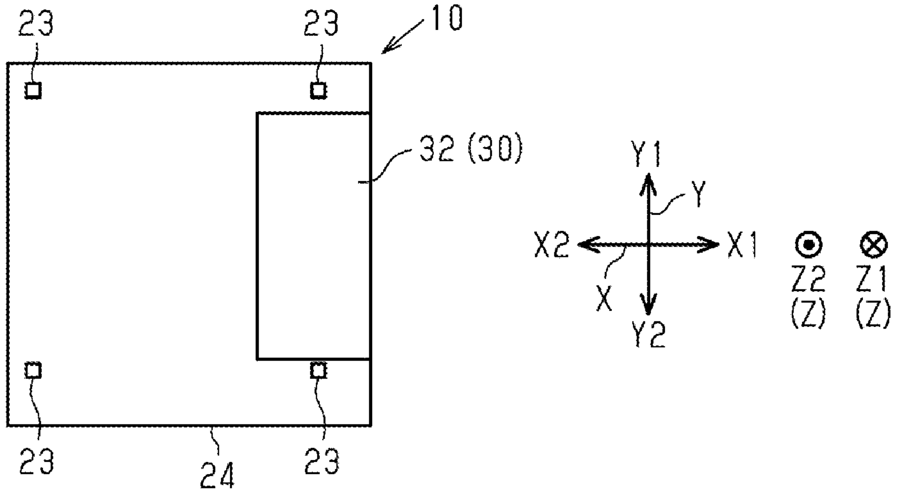
FIG. 10 is a schematic diagram illustrating the bottom portion.
Figure 11:
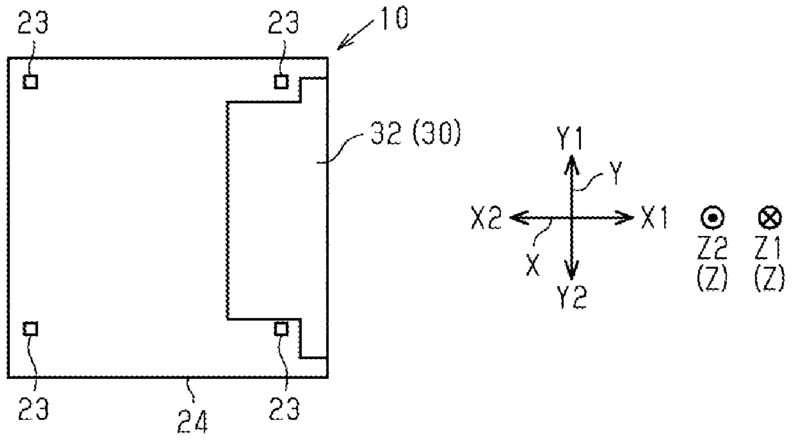
FIG. 11 is a schematic diagram illustrating the bottom portion.
Figure 12:
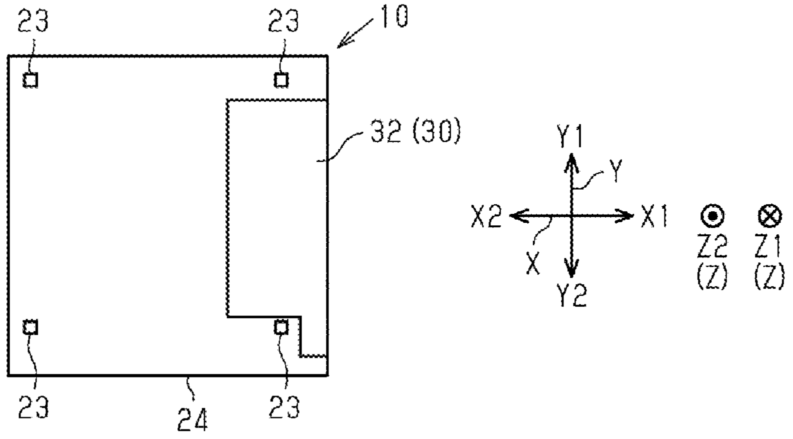
FIG. 12 is a schematic diagram illustrating the bottom portion.

In the embodiment, as illustrated in FIG. 10, the second bottom portion 32 has a shape shorter than the interval between the installation portions 23 in the longitudinal direction Y, but the present disclosure is not limited thereto, and the second bottom portion 32 may have any shape as long as the installation portions 23 are not located in the movement region of the second bottom portion 32. For example, as illustrated in FIG. 11, the second bottom portion 32 may have a shape longer than the interval between the installation portions 23 in the longitudinal direction Y as long as the second bottom portion 32 is located on a side in the rightward direction X1 of the installation portions 23. Further, for example, as illustrated in FIG. 12, the shape may be asymmetrical in the longitudinal direction Y.

In the embodiment, the bottom portion 30 is fixed to the frame 24 except for the second bottom portion 32, but the present disclosure is not limited thereto. For example, the bottom portion 30 may be configured so that a plurality of members can be attached and detached. In addition, for example, the bottom portion 30 may be configured so that a plurality of members can be attached and detached in different directions.

Figure 13:
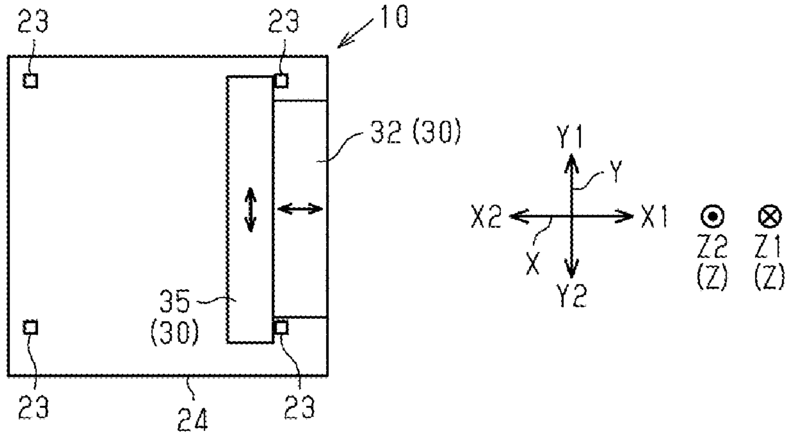
FIG. 13 is a schematic diagram illustrating the bottom portion.

As illustrated in FIG. 13, as a specific example, the bottom portion 30 may include the second bottom portion 32 and the fifth bottom portion 35. The second bottom portion 32 can be attached and detached in the lateral direction X. The second bottom portion 32 may have a shape shorter than the interval between the installation portions 23 in the longitudinal direction Y. The fifth bottom portion 35 can be attached and detached in the longitudinal direction Y. The fifth bottom portion 35 may be located further inward from the installation portion 23 on a side in the rightward direction X1. Further, for example, the bottom portion 30 may not include the third bottom portion 33 and the fourth bottom portion 34.

The housing 11 may include an openable and closable door on the right side. In this case, by opening the door, the second bottom portion 32 is in a detachable state. That is, the second bottom portion 32 may or may not be exposed to the outside of the housing 11 as long as the second bottom portion 32 can be attached to and detached from the outside of the housing 11.

The second bottom portion 32 may be positioned at at least one of the frame 24 or the first bottom portion 31. The second bottom portion 32 may be fixed to at least one of the frame 24 or the first bottom portion 31. That is, the second bottom portion 32 may be attached to and detached from the frame 24 and may not be directly fixed to the frame 24. The fixing portion 39 may be any fixing unit such as a snap-fit structure. The fixing portion 39 may fix the second bottom portion 32 to the frame 24 with a play therebetween, or may fix the second bottom portion 32 to the frame 24 without a play.

The first region 28 may overlap another liquid accommodating portion other than the second liquid accommodating portion 42 in the lateral direction X and the longitudinal direction Y in a plan view in the vertical direction Z. That is, the second liquid accommodating portion 42 may be provided partially or entirely overlapping the nozzle surface 22 in the lateral direction X and the longitudinal direction Y in a plan view in the vertical direction Z. In addition, the first region 28 may not overlap the second liquid accommodating portion 42 in the lateral direction X and the longitudinal direction Y in a plan view in the vertical direction Z, or may overlap another liquid accommodating portion.

The second region 29 may overlap a liquid accommodating portion other than the second liquid accommodating portion 42 in the lateral direction X and the longitudinal direction Y in a plan view in the vertical direction Z. That is, the second liquid accommodating portion 42 may be provided partially or entirely overlapping the conveying belt 19 in the lateral direction X and the longitudinal direction Y in a plan view in the vertical direction Z. In addition, the second region 29 may not overlap the second liquid accommodating portion 42 in the lateral direction X and the longitudinal direction Y in a plan view in the vertical direction Z, or may overlap another liquid accommodating portion.

For example, at least one of the plurality of liquid accommodating portions such as the first liquid accommodating portion 41 and the second liquid accommodating portion 42 may not include the liquid absorber 50. The bottom portion 30 may not include a plurality of liquid accommodating portions and may include one liquid accommodating portion. Also, at least one of the first bottom portion 31 or the second bottom portion 32 may include the liquid accommodating portion 40. In addition, at least the second bottom portion 32 may include the liquid accommodating portion 40.

The installation portions 23 may be attached to the bottom surface 24A of the frame 24 or may be attached to the bottom surface of the first bottom portion 31.

The frame 24 may include a slide rail on which the first bottom portion 31 slides when the first bottom portion 31 is attached. The frame 24 may include a slide rail on which the second bottom portion 32 slides when the second bottom portion 32 is attached.

Directions in which the frame 24 and the second bottom portion 32 are attached and detached need not be strictly limited to the horizontal direction, and may be directions in which attachment and detachment can be performed without tilting the recording device 10. That is, the direction in which the frame 24 and the second bottom portion 32 are attached and detached may be a direction in which some error occurs in the horizontal direction.

The second bottom portion 32 may be removed in the leftward direction X2. The second bottom portion 32 may be attachable to and detachable from the frame 24 in the longitudinal direction Y. The second bottom portion 32 may be removed in the forward direction Y1. The second bottom portion 32 may be removed in the rearward direction Y2. The second bottom portion 32 may be attachable to and detachable from the frame 24 in the vertical direction Z. The second bottom portion 32 may be removed in the downward direction Z2.

The additional unit 90 may not be an additional paper feeding unit, but may be another unit. As a specific example, the additional unit 90 may be a liquid accommodating unit that can accommodate the liquid. In this case, by removing the second bottom portion 32, the communication path for supplying the liquid to the recording unit 12 is opened. The additional unit 90 may be a waste liquid accommodating unit that accommodates the liquid from the recording unit 12 as a waste liquid. In this case, by removing the second bottom portion 32, the communication path for discharging the waste liquid from the recording unit 12 is opened.

The conveying belt 19 functions as the medium support unit, but the present disclosure is not limited thereto, and for example, any configuration such as a platen without a conveying function may function as the medium support unit. The medium support unit may be movable or immovable.

In the recording unit 12, an angle formed by the discharging direction and the horizontal direction may not be 90 degrees, and the angle formed by the discharging direction and the horizontal direction may be 90 degrees. The nozzle surface 22 is capped by a cap (not illustrated) when the liquid is not discharged, but the liquid may leak from the cap. In such a case, the liquid is more likely to leak from the recording unit 12 in which the angle formed by the discharging direction and the horizontal direction is not 90 degrees than the recording unit 12 in which the angle formed by the discharging direction and the horizontal direction is 90 degrees. For this reason, the present disclosure may be adopted for the recording unit 12 in which the angle formed by the discharging direction and the horizontal direction is not 90 degrees, and the present disclosure may be adopted for the recording unit 12 in which the angle formed by the discharging direction and the horizontal direction is greater than 0 degrees and equal to or less than 30 degrees.

The recording device 10 may be a laser-type printer that records images by applying toner using laser light. That is, the recording device 10 does not care about a recording method, and it does not matter whether the recording method is an inkjet method or a laser method.

The expression "at least one of" used herein means one or more of desired options. As an example, the phrase "at least one of" used herein means only one option or both of the two options if the number of options is two. As another example, the expression "at least one of" used herein means only one option or any combination of two or more options if the number of options is three or more.

Supplementary Note

The technical ideas and their operations and effects ascertained from the above-described embodiment and modified examples will be described below.

(A) In the recording device, the housing includes the frame and the bottom portion attached to the frame, and the bottom portion includes the first bottom portion fixed to the frame and the second bottom portion detachably fixed to the frame.

According to this configuration, the first bottom portion is fixed to the frame while the frame and the second bottom portion are attachable and detachable, and thus there is no need to attach and detach the entire bottom portion. Accordingly, work efficiency can be improved.

(B) In the recording device, the second bottom portion may be attachable and detachable along the first direction intersecting the vertical direction.

According to this configuration, there is no need to lift the recording device to remove the second bottom portion from the frame, and there is no need to tilt the recording device to attach and detach the frame and the second bottom portion. In this way, with the recording device installed, the frame and the second bottom portion can be attached and detached along the first direction. Accordingly, work efficiency can be improved.

(C) In the recording device, the second bottom portion may include the grip portion, and the second bottom portion may be attachable and detachable along the first direction by gripping the grip portion.

According to this configuration, by gripping the grip portion, the frame and the second bottom portion can be attached and detached along the first direction. Accordingly, work efficiency can be improved.

(D) In the recording device, the first direction may be a direction intersecting the second direction facing the front side.

According to this configuration, the frame and the second bottom portion can be attached and detached along the first direction intersecting the front side of the recording device. Thus, degrees of freedom can be given to functions and designs on the front side of the recording device, and work efficiency can be improved as compared to the back side of the recording device.

(E) In the recording device, the frame may include the communication path that can communicate with the outside in the downward direction of the vertical direction, and the second bottom portion may close the communication path when attached to the frame, and may open the communication path when detached from the frame.

According to this configuration, by removing the second bottom portion from the frame, the communication path that can communicate with the outside can be opened in the downward direction of the vertical direction. Accordingly, the work efficiency of providing the communication path with the outside can be improved.

(F) The recording device may include the attaching portion to which the additional unit can be attached, at the lower side of the first bottom portion in the vertical direction, and the communication path may enable communication between the additional unit and the inside of the housing when the second bottom portion is removed from the frame.

According to this configuration, by removing the second bottom portion from the frame, it is possible to open the communication path that can communicate with the additional unit. Accordingly, the work efficiency of providing the communication path with the additional unit can be improved.

(G) In the recording device, when removed from the frame, the second bottom portion may be attachable to and detachable from the lower side in the vertical direction of the additional unit attached to the attaching portion.

According to this configuration, the second bottom portion can be commonly used in the recording device and the additional unit. Thus, there is no need to manufacture unnecessary components. Accordingly, along with improvement of the work efficiency, component costs can be reduced and contribution to the environment can be increased.

(H) In the recording device, the recording unit may perform recording on the medium by discharging the liquid, and at least one of the first bottom portion or the second bottom portion may include the liquid accommodating portion that can accommodate the liquid leaking from the recording unit.

According to this configuration, the liquid leaking from the recording unit can be accommodated in the liquid accommodating portion in at least one of the first bottom portion or the second bottom portion. Accordingly, leakage of the liquid to the outside of the recording device can be inhibited.

(I) The recording device may include the liquid absorber that can absorb the liquid, and the liquid absorber may be provided at the liquid accommodating portion.

According to this configuration, the liquid accommodated in the liquid accommodating portion can be absorbed by the liquid absorber. Accordingly, leakage of the liquid to the outside of the recording device can be inhibited.

(J) In the recording device, the recording unit may include the nozzle surface in which each of the plurality of nozzles that discharge the liquid opens, and the liquid accommodating portion may be provided partially or entirely overlapping the nozzle surface in the first direction intersecting the vertical direction and the second direction intersecting the vertical direction and the first direction in a plan view in the vertical direction.

According to this configuration, even if the liquid leaking from the nozzle surface drips in the downward direction, the liquid accommodating portion is provided below the nozzle surface in the vertical direction, the liquid leaking from the nozzle surface is easily accommodated. Accordingly, leakage of the liquid to the outside of the recording device can be inhibited.

(K) The recording device may include the medium support unit configured to support the medium, the recording unit may include the nozzle surface in which each of the plurality of nozzles that discharges the liquid opens, the medium support unit may be provided at a position facing the nozzle surface, and the liquid accommodating portion may be provided partially or entirely overlapping the medium support unit in the first direction intersecting the vertical direction and the second direction intersecting the vertical direction and the first direction in a plan view in the vertical direction.

According to this configuration, even if the liquid leaking from the nozzle surface flows along the medium support unit and drips in the downward direction, the liquid accommodating portion is provided below the medium support unit in the vertical direction, and thus the liquid leaking from the nozzle surface is easily accommodated. Accordingly, leakage of the liquid to the outside of the recording device can be inhibited.

(L) The recording device may include the conveying unit that conveys the medium along the conveying path, the conveying path may include the first conveying path that conveys the medium to the recording unit and the second conveying path that conveys the medium from the recording unit to the outside, at least the second bottom portion may include the liquid accommodating portion, and the first conveying path may be provided between the second bottom portion and the nozzle surface in the vertical direction when the second bottom portion is attached to the frame.

According to this configuration, even if the liquid leaking from the nozzle surface flows along the first conveying path and drips in the downward direction, the liquid accommodating portion is provided below the first conveying path in the vertical direction, and thus the liquid leaking from the nozzle surface is easily accommodated. Accordingly, leakage of the liquid to the outside of the recording device can be inhibited. In addition, by removing the second bottom portion provided with the liquid accommodating portion, maintenance of the liquid accommodating portion provided in the second bottom portion can be easily performed. Accordingly, work efficiency can be improved.

(M) The recording device may include the installation portion that can be installed at the installation surface, and the installation portion may be provided outside the movement region of the second bottom portion at the bottom surface of the housing.

According to this configuration, by providing the installation portion outside the movement region of the second bottom portion, the second bottom portion can be attached and detached even when the installation portion is provided. Accordingly, work efficiency can be improved.

(N) In the recording device, the second bottom portion may include the positioning portion that performs positioning with respect to the frame.

According to this configuration, attachment accuracy of the second bottom portion, which is attachable to and detachable from the frame, with respect to the frame can be improved. Accordingly, the second bottom portion can be stably attached while work efficiency is improved.

(O) The recording device may include the fixing portion that fixes the second bottom portion when the second bottom portion is attached to the frame.

According to this configuration, the second bottom portion, which is attachable to and detachable from the frame, can be fixed to the frame. Accordingly, the second bottom portion can be stably attached while work efficiency is improved.

(P) In the recording device, the second bottom portion may be attachable and detachable along the first direction intersecting the vertical direction, the first direction may be a direction intersecting the second direction facing the front side, and the fixing portion may be configured to fix the second bottom portion to the frame by an operation in the first direction.

According to this configuration, the frame and the second bottom portion can be attached and detached by an operation in the first direction intersecting the front side of the recording device. Thus, degrees of freedom can be given to functions and designs on the front side of the recording device, and work efficiency can be improved as compared to the back side of the recording device.

What is claimed is:

1. A recording device comprising:

a recording unit configured to perform recording on a medium; and a housing configured to accommodate the recording unit, wherein the housing includes a frame and a bottom portion attached to the frame in a vertical direction, the bottom portion includes a first bottom portion fixed to the frame and a second bottom portion detachably fixed to the frame, the recording unit performs recording on the medium by discharging a liquid, and at least one of the first bottom portion or the second bottom portion includes a liquid accommodating portion configured to accommodate the liquid leaking from the recording unit, and the second bottom portion is attachable and detachable along a first direction intersecting the vertical direction.

2. The recording device according to claim 1, wherein the second bottom portion includes a grip portion and the second bottom portion is attachable and detachable along the first direction by gripping the grip portion.

3. The recording device according to claim 1, wherein the first direction is a direction intersecting a second direction facing a front side.

4. The recording device according to claim 1, wherein the frame includes a communication path configured to communicate with the outside in a downward direction of a vertical direction and the second bottom portion closes the communication path when attached to the frame and opens the communication path when detached from the frame.

5. The recording device according to claim 4, further comprising an attaching portion to which an additional unit is attachable, at a lower side of the first bottom portion in a vertical direction, wherein the communication path enables communication between the additional unit and an inside of the housing when the second bottom portion is removed from the frame.

6. The recording device according to claim 5, wherein when removed from the frame, the second bottom portion is attachable to and detachable from a lower side in the vertical direction of the additional unit attached to the attaching portion.

7. The recording device according to claim 1, further comprising a liquid absorber configured to absorb the liquid, wherein the liquid absorber is provided at the liquid accommodating portion.

8. The recording device according to claim 1, wherein the recording unit includes a nozzle surface in which each of a plurality of nozzles are configured to discharge the liquid opens and the liquid accommodating portion is provided partially or entirely overlapping the nozzle surface in a first direction intersecting the vertical direction and a second direction intersecting the vertical direction and the first direction in a plan view in the vertical direction.

9. The recording device according to claim 8, further comprising a conveying unit configured to convey the medium along a conveying path, wherein the conveying path includes a first conveying path configured to convey the medium to the recording unit and a second conveying path configured to convey the medium from the recording unit to the outside, at least the second bottom portion includes the liquid accommodating portion, and the first conveying path is provided between the second bottom portion and the nozzle surface in the vertical direction when the second bottom portion is attached to the frame.

10. The recording device according to claim 1, further comprising a medium support unit configured to support the medium, wherein the recording unit includes a nozzle surface in which each of a plurality of nozzles configured to discharge the liquid opens, the medium support unit is provided at a position facing the nozzle surface, and the liquid accommodating portion is provided partially or entirely overlapping the medium support unit in a first direction intersecting the vertical direction and a second direction intersecting the vertical direction and the first direction in a plan view in the vertical direction.

11. The recording device according to claim 1, further comprising an installation portion configured to be installed at an installation surface, wherein the installation portion is provided outside a movement region of the second bottom portion at a bottom surface of the housing.

12. The recording device according to claim 1, wherein the second bottom portion includes a positioning portion configured to perform positioning with respect to the frame.

13. The recording device according to claim 1, further comprising a fixing portion configured to fix the second bottom portion when the second bottom portion is attached to the frame.

14. The recording device according to claim 13, wherein the second bottom portion is attachable and detachable along a first direction intersecting the vertical direction, the first direction is a direction intersecting a second direction facing a front side, and the fixing portion is configured to fix the second bottom portion to the frame by an operation in the first direction.

* * * * *